United States Patent Office 2,833,653
Patented May 6, 1958

2,833,653
WET-ROASTING OF GREEN COFFEE

Fletcher A. Chase, Morris Plains, and Samuel Lee, Fair Lawn, N. J., assignors, by mesne assignments, to American Home Products Corporation, New York, N. Y., a corporation of Delaware No Drawing. Application October 27, 1954
Serial No. 465,144

4 Claims. (Cl. 99—71)

This invention relates to the wet-roasting of green coffee and the resulting product. More particularly it relates to a process of wet-roasting green coffee, forming an aqueous extract thereof and evaporating the extract to produce a soluble residue adapted, on resolution in water, to produce a coffee beverage of high quality, or alternatively adapted to be blended with conventional soluble coffee to lend improved flavor and aroma to the product.

The development of present day soluble coffees has been a continuous effort to approximate more and more closely the flavor and aroma of beverage coffee brewed from freshly roasted and ground coffee beans. Various expedients have been disclosed for accomplishing this.

Among those in which the beans were brought into contact with water before or during roasting or before extraction may be mentioned the following.

In 1910 the Gebrüder Niessen obtained British Patent No. 7,427/1910 for a process involving absorption of a limited amount of moderately concentrated sugar solution by green coffee beans and subsequently roasting of the beans and absorbed solution. In 1924 Oprean obtained U. S. Patent No. 1,499,780 for a process in which green coffee was partially roasted, then sprayed with cold water, and finally roasted to completion. In 1936 Katharina Gebhardt obtained British Patent No. 442,232 for a somewhat different process; according to her disclosure freshly ground roasted coffee is first heated at 40°–50° C., cold water is then added, e. g. in a ratio of 6 l. water to 9 kg. coffee, while the temperature of the material is maintained at 50°–80° C. for several hours. The coffee is then ready for conventional extraction.

None of these three processes is directed to the production of solid soluble coffee.

In 1933, however, Copes et al. obtained U. S. Patent No. 1,932,769 for Soluble Coffee. According to this patent ground green coffee is preheated at a below-roasting temperature and extracted with water. The coffee is not roasted in the presence of water, but the extract is evaporated and the evaporation residue is roasted to yield a solid soluble coffee product. As far as we know, this process has not been adopted commercially.

It is an object of this invention to provide a simple and economical process for producing solid, completely soluble coffee of improved flavor and aroma. It is another object to produce a higher yield of product than is produced by prior extraction processes. It is a further object to produce such a product which may be used as such or may be blended with a conventional solid soluble coffee to impart to it improved aroma and flavor.

According to our invention, we treat green coffee in comminuted form, in a pressure vessel, with water at roasting temperatures for a sufficient time to develop the desired flavor and aroma and produce a sudden increase of pressure in the vessel above the saturated steam pressure, cool the mixture, and separate the aqueous extract from the solid residue. The extract may be evaporated as by spray-drying, or it may be mixed with the concentrated extract produced in the manufacture of conventional soluble coffee before the final spray-drying step.

In the former case the solid product may be used as such or may be blended with a conventional solid soluble coffee in any desired ratio. In the latter case, spray-drying of the blended extracts will produce a soluble coffee of increased strength and improved flavor and aroma.

Conventional soluble coffee is ordinarily made by conventionally roasting and grinding green coffee and passing hot water through a series of percolators containing the ground roasted coffee to form a highly concentrated coffee extract, and then spray-drying the extract. Such a process may be expected to yield up to 25–27% of the weight of the green coffee as soluble coffee solids. By our process we obtain a yield up to 30–35%.

The amount of water used in our process is not critical but should be greater in weight than the weight of coffee treated, e. g. 2 to 10 times the weight of coffee. The preferred temperature of treatment is approximately 400° F. but may vary in the approximate range 375°–450° F. This temperature and the time of treatment will vary, depending on the type of coffee treated and the quality of roast desired. Ordinarily a one hour treatment will be preferred, but as little as 5 minutes at 450° F. or as much as 2 hours in the lower range may produce satisfactory results. Coffee, like all natural products is variable in quality, so that these conditions of operation are intended as guides to those skilled in the art rather than as clear cut limitations.

The following examples illustrate embodiments of our invention, but are not to be taken as limiting its scope which is defined in the appended claims.

Example 1

One pound of coarsely comminuted green coffee and 2 quarts of water are placed in a pressure vessel provided with heating means and a stirrer. The mixture is heated with agitation to a temperature of 400° F. and maintained at this level for 1 hour. At 212° F., atmospheric gases are bled off. The gage pressure will then rise gradually to about 300 pounds per square inch, somewhat above the pressure of saturated steam at that temperature. Near the end of the operation, the pressure will suddenly rise an additional 75 to 150 lbs., up to as high as 450 lbs., owing to the liberation of gaseous products. This indicates completion of roasting.

The pressure vessel is cooled to room temperature and the contents filtered. The filtrate is a clear dark brown liquid containing 6–7 percent coffee solids.

The grounds are further extracted with cold water to remove all the solubles. Combined yield is approximately 5–5½ oz. solids.

The combined liquids are added to a portion of concentrated extract produced in the commercial manufacture of soluble coffee at a solids ratio of 1:20 and the mixture is spray-dried. The strength of the resulting solid soluble coffee is greatly increased and its flavor and aroma improved as compared with the spray-dried product of the commercial extract without the addition of our product.

Alternatively the filtrate of our process may be directly spray-dried. The resulting solid soluble coffee is a potent flavorful product if used alone, or a desirable adjuvant for conventional soluble coffee.

Example 2

One bag of coarsely ground coffee, 130 lbs., was charged into a pressure vessel of 100 gal. capacity and 60 gal. water added. The pressure vessel was an externally fired rotated autoclave. It was heated to 400° F.

internal temperature and held at that temperature for 20 minutes. The gage pressure was 300 pounds per square inch at 400° F. and then rose to 450 lbs. suddenly towards the end of the period. The heating was stopped; after spontaneous cooling for one hour, the autoclave was sprayed with cold water and cooled to room temperature.

The extract was decanted and treated as in Example 1.

Alternatively the extract may be independently spray-dried to yield a solid soluble coffee.

We claim:

1. In a process of preparing a coffee extract suitable for use in the manufacture of a solid soluble coffee preparation, in which process unroasted coffee is heated with water in a pressure vessel at a temperature above 300° F., the improvement which comprises: suspending comminuted unroasted coffee in water in a closed pressure vessel, heating the contents of the vessel to a temperature in the range 375°–450° F., continuing the heating in this range until a sudden rise of pressure of the order of 75–150 pounds per square inch, gage, occurs, and separating the aqueous extract from the grounds.

2. The process defined in claim 1 in which the coffee: water ratio is 1:4 by weight and the heating temperature is 400° F.

3. The process of making a coffee extract suitable for use in the manufacture of solid soluble coffee which comprises suspending comminuted unroasted coffee in 2–10 times its weight of water in a pressure vessel provided with agitating means, heating the suspension while agitating it, bleeding off atmospheric gases at approximately 212° F., continuing the heating to a temperature in the range 375°–450° F., whereby the gage pressure rises gradually to a pressure somewhat above the equilibrium pressure of saturated steam at the temperature then obtaining, further maintaining the temperature in the said range until a sudden increase of pressure of 75–150 lb. gage occurs, cooling the contents of the pressure vessel, separating the liquid extract from the grounds, washing the grounds with additional water, and combining the washings with the first extract.

4. In combination with the process of claim 3, including the steps of suspending comminuted unroasted coffee in water in a pressure vessel with agitating means, heating the suspension, bleeding off atmospheric gases, continuing the heating until a sudden increase of pressure occurs, cooling the contents of the pressure vessel, washing the grounds with additional water and combining the washings with the first extract, the further steps which comprise mixing said combined extract and washings with a highly concentrated coffee extract produced by extracting ground roasted coffee with hot water in a series of percolators in such a ratio that said combined first extract and washings contribute a minor part of the soluble solids to the resulting mixed extracts, and spray-drying the mixed extracts.

References Cited in the file of this patent

UNITED STATES PATENTS

| | | |
|---|---|---|
| 95,015 | Galloway | Sept. 21, 1869 |
| 1,179,046 | Sherer | Apr. 11, 1916 |
| 1,393,045 | Scott | Oct. 11, 1921 |
| 1,499,780 | Oprean | July 1, 1924 |
| 1,932,769 | Cupes | Oct. 31, 1933 |
| 1,989,077 | Bredt | Jan. 29, 1935 |
| 2,444,217 | Armentrout | June 29, 1948 |
| 2,594,385 | Blench | Apr. 29, 1952 |
| 2,712,501 | Hale et al. | July 5, 1955 |

FOREIGN PATENTS

| | | |
|---|---|---|
| 3,031 | Great Britain | of 1910 |
| 7,427 | Great Britain | of 1910 |